May 3, 1966        G. NATTA ETAL        3,249,589
PROCESS FOR PRODUCING KETENE POLYMERS AND PRODUCTS THEREFROM
Filed Dec. 21, 1960

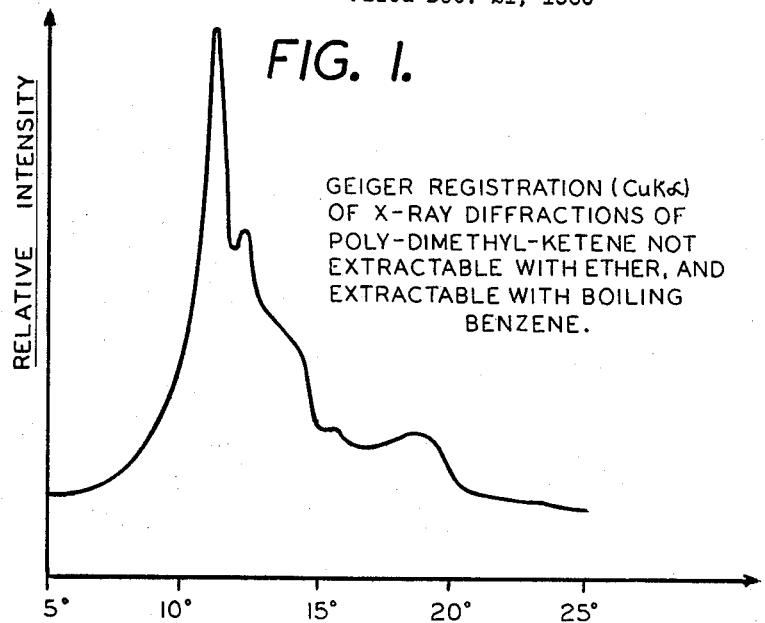

FIG. 1.

GEIGER REGISTRATION (CuKα) OF X-RAY DIFFRACTIONS OF POLY-DIMETHYL-KETENE NOT EXTRACTABLE WITH ETHER, AND EXTRACTABLE WITH BOILING BENZENE.

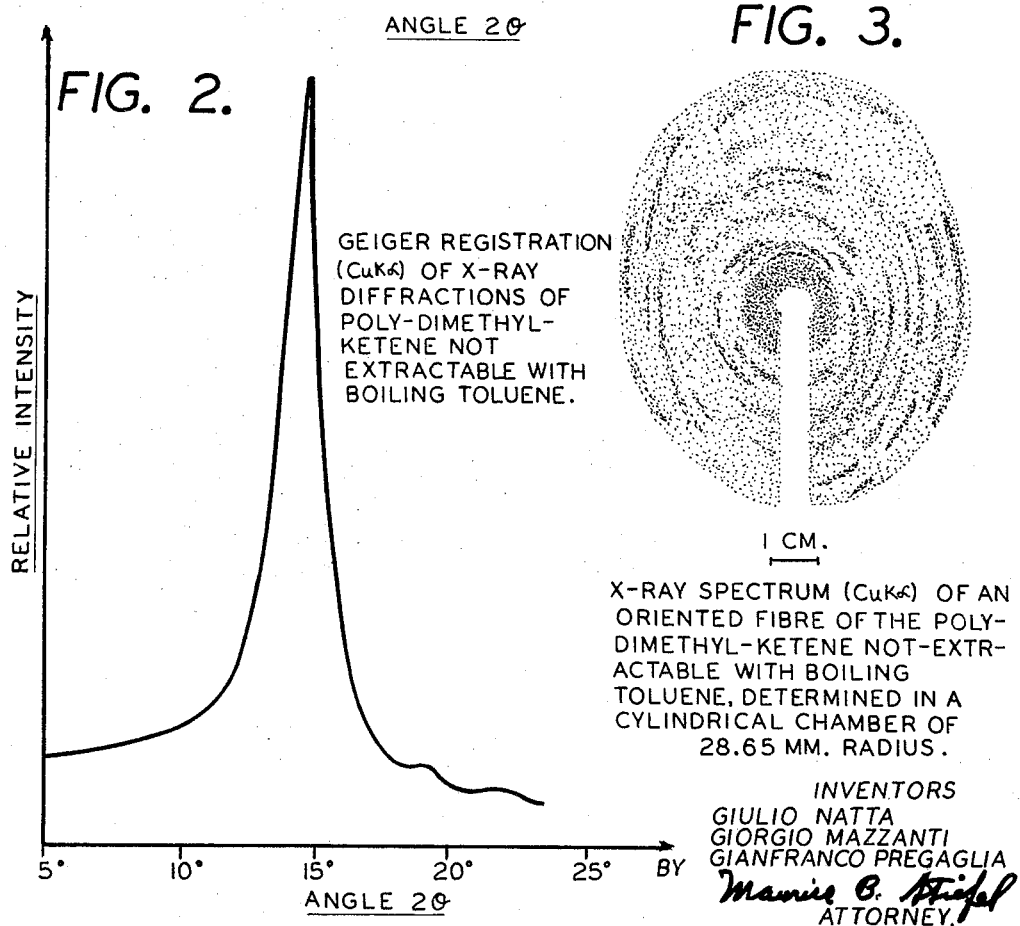

FIG. 2.

GEIGER REGISTRATION (CuKα) OF X-RAY DIFFRACTIONS OF POLY-DIMETHYL-KETENE NOT EXTRACTABLE WITH BOILING TOLUENE.

FIG. 3.

X-RAY SPECTRUM (CuKα) OF AN ORIENTED FIBRE OF THE POLY-DIMETHYL-KETENE NOT-EXTRACTABLE WITH BOILING TOLUENE, DETERMINED IN A CYLINDRICAL CHAMBER OF 28.65 MM. RADIUS.

INVENTORS
GIULIO NATTA
GIORGIO MAZZANTI
GIANFRANCO PREGAGLIA
BY
ATTORNEY.

United States Patent Office 3,249,589
Patented May 3, 1966

3,249,589
PROCESS FOR PRODUCING KETENE POLYMERS AND PRODUCTS THEREFROM
Giulio Natta, Giorgio Mazzanti, and Gianfranco Pregaglia, all of Milan, Italy, assignors to Montecatini Societa Generale per l'Industria Mineraria e Chimica, Milan, Italy
Filed Dec. 21, 1960, Ser. No. 77,426
Claims priority, application Italy, Dec. 24, 1959, 21,439/59; July 1, 1960, 11,670/60
19 Claims. (Cl. 260—63)

The present invention relates to new high molecular weight linear polymers, having a regular chemical structure, of ketenes having the general formula $$R_2C=C=O$$

wherein R is an alkyl group containing from one to six carbon atoms, a cycloalkyl or an alkyl-aryl group and to a process for preparing them.

The new polymers of the present invention possess, because of their high regularity of structure, a crystallinity which is detectable by X-ray examination.

The possibility of preparing crystallizable polymers of ketenes having a regular structure, could not have been foreseen.

FIGURES 1 and 2 are the registration curves of the Geiger counter reflections given upon X-ray examination of the polymer fractions of the present invention using CuKα radiation.

FIGURE 3 depicts the X-ray spectrum (CuKα) of an oriented fiber determined in a cylindrical chamber of 28.65 mm. radius.

In monomers having the formula 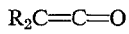, there are in fact two polymerizable double bonds which can cause the formation of monomeric units having different chemical structures, such as the following:

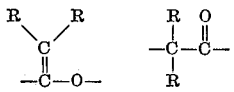

The only example of polymers of ketenes of the above chemical structures known up to now are the polymerization products of dimethylketene $(CH_3)_2C=C=O$, prepared by Staudinger (Helvetica Chimica Acta 8, 306 (1925)) by operating at temperatures of from $-80°$ C. to $0°$ C. in the presence of trimethylamine as a catalyst.

According to Staudinger, the polymers thus obtained are always amorphous and noncrystallizable, even when the polymerization conditions are varied, and these polymers always contain in the main chain both etheric and carbon-to-carbon bonds. The polymerization products thus obtained should therefore be considered as copolymers of both these monomeric units.

According to Staudinger, the products obtained by him should correspond to a cyclic formula containing 3 monomeric dimethyl-ketene units polymerized on the ethylenic bond and 2 units polymerized by the opening of the >C=O bond. All the polymerization products obtained by Staudinger are thermally unstable and decompose with the formation of volatile products when heated to temperatures between 120° C. and 200° C.

It has now been surprisingly found that it is possible to prepare linear high polymers of ketenes of the formula $R_2C=C=O$, which even in the crude, unfractionated state are crystalline according to X-ray examination.

Moreover, it has also been surprisingly found that, by physical fractionation processes, such as for example by extraction with suitable solvents, various fractions can be isolated from the crude polymers. These separated fractions are highly crystalline as determined by X-ray examination and consist of high molecular weight linear molecules which necessarily possess a succession of regularly repeated constituent elements.

Using the crude polymers obtained from the polymerization of dimethylketene by the process of the present invention, it is possible, for instance, to isolate a fraction which is not extractable with acetone, but is extractable with benzene, which fraction shows, in general, in intrinsic viscosity (measured in tetrahydronaphthalene at 135° C.) of between 0.2 and 1.5, and which is found to be highly crystalline upon X-ray examination. This crystallinity is observed also in the polymer powder obtained by extraction or in the product not subjected to further thermal or mechanical orientation treatments. (See FIGURE 1 of the accompanying drawings.)

By successive extraction with boiling toluene (or chloroform) a further small percentage (up to 10%) of the total polymer is dissolved.

The fraction not extractable with boiling toluene (or chloroform), on the other hand, is found to consist of macromolecules having a crystalline structure, which is completely different from that of the other fractions, and which fraction has, in general, an intrinsic viscosity (measured in nitrobenzene at 135° C.) of between 0.5 and 2.

These two fractions are not different crystalline modifications of the same product, since the two fractions present very different infrared absorption spectra when examined in the molten state.

For instance, in the infrared spectrum of the fractions extractable with boiling toluene, intense absorption bands are clearly observable at about 9 microns, while these bands are not present in the infrared spectrum of the fraction not extractable with boiling toluene.

The fraction not extractable with toluene is also highly crystalline upon X-ray examination. A high crystallinity is observed in this fraction even in the state of a non-oriented powder as obtained by extraction (see FIGURE 2).

The modified polymer, obtained after melting and cooling the same product, is also highly crystalline (but with a different lattice structure).

By extrusion of the polymer not extractable with boiling toluene and subsequent stretching, fibers are obtained which are found to be highly oriented as indicated by X-ray examination. FIGURE 3 shows the X-ray spectrum (CuKα) of an oriented fiber, determined in a cylindrical chamber of 28.65 mm. radius. From this spectrum, it can be established that the macromolecules possess an identity period of about 8.8 A. and that the chain section corresponding to this period presumably contains 4 monomeric units.

Crystalline poly-dimethyl-ketene which is not extractable with toluene, has a melting point of 250–255° C. under the polarizing microscope. Furthermore, it has been found that by heating to this temperature either this polymer or the one extractable with boiling toluene, no decomposition, resulting in the formation of low molecular weight volatile substances, takes place. This fact further differentiates these polymers from those described in the literature, which were found to be thermally unstable even at temperatures below 200° C.

The new ketene polymers may be prepared by polymerization of the monomer in the presence of a catalyst having the general formula $AlR'_nX_m$, or addition complexes of compounds of said formula particularly with organic oxygen containing bases, such as ethers, their dimers or mixtures of them.

In the above general formula, R' represents an alkyl, aryl, cycloalkyl or alkoxy group or a hydrogen atom. X is a halogen atom, $m$ is 0, 1, 2 or 3, and $n$ is $(3-m)$.

As catalysts, compounds having the following empirical formulae may be used: $AlCl_2(C_2H_5)$; $AlCl(C_2H_5)_2$;

Al(C$_6$H$_5$)Cl$_2$; Al(OC$_3$H$_7$)Br$_2$; AlBr$_3$; AlCl$_3$·O(C$_2$H$_5$)$_2$ or their dimers, or the sesquihalides of the type

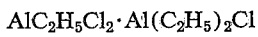

AlC$_2$H$_5$Cl$_2$·Al(C$_2$H$_5$)$_2$Cl

Ketene polymers, according to the present invention, may alternatively be prepared by polymerization of the monomer in the presence of a catalyst consisting of an organometallic compound of a metal belonging to the second group of the Periodic Table according to Mendeleeff or of addition complexes of these compounds with organic oxygen containing bases such as ethers.

As polymerization catalysts, dialkyl beryllium, alkyl baryllium monohalides (or association products of dialkyl beryllium with beryllium dihalides), dialkyl magnesium, alkyl magnesium monohalides, dialkyl zinc and alkyl zinc monohalides are preferably used.

The polymerization can be carried out at temperatures of from −100° C. to +25° C., preferably from −80° C. to −20° C., in the presence or absence of organic compounds which act as solvents. As polymerization solvents, organic compounds which do not react with the monomers and do not decompose the catalyst under the polymerization conditions can be used. For example, aliphatic or aromatic hydrocarbons are suitable.

It has also been noted that by varying the type of aluminum-containing catalyst used, the ratio between the amount of polymer extractable with toluene and the amount of polymer not extractable with toluene varies in the crude polymer obtained. As a general rule, aluminum catalysts having a higher cationic activity favor, the temperature being the same, the formation of a polymer which is not extractable with toluene.

When using the catalysts of the second group of the Periodic Table, particularly when using beryllium catalysts, the polymerization of dimethylketene at a temperature between −80° C. and −10° C. leads to the production of polymers substantially not extractable with boiling toluene.

The macromolecules of polydimethylketene, not extractable with boiling toluene, have substantially the chemical structure of a poly-β-ketone, which can be represented by the following formula:

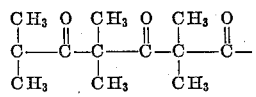

These macromolecules are formed by polymerization of the monomer on the internal double bond >C=C< and by regular head-to-tail enchainment of the monomeric units. The structure of this fraction is demonstrated by high temperature digestion in an alkaline medium and by the reduction of the carbonyl groups to hydroxyl groups, as shown by the following:

5 gm. of polydimethylketene, not extractable with boiling toluene, are suspended in a mixture of 200 cc. tetrahydrofurane and 20 cc. of absolute ethyl alcohol to which traces of metallic sodium have been added. The suspension thus obtained is heated in a shaking autoclave for 48 hours at 180° C. and for 48 hours at 260° C. under a nitrogen pressure of about 20 atm. After this treatment, 0.8 gm. of a substantially unaltered polymer, which possesses the same X-ray diffraction spectrum and infrared absorption spectrum as the starting polymer, were recovered by filtration. From the filtrate, after separation of the solvents, 5.1 gm. of a liquid product, boiling up to 130° C. under a pressure of 20 mm. of mercury, and 1.9 gm. of a liquid boiling at a higher temperature were isolated.

From the analysis carried out by gas phase chromatography, the first fraction was found to consist substantially of a mixture of ethyl isobutyrate and di-isopropylketone. In addition to these products, small amounts of substances with a much lower volatility and, presumably, higher molecular weight were present. The residual 1.9 gm. high boiling fraction, after treatment with sodium alcoholate at the boiling point for 90 hours, gives a chromatogram in which the peaks corresponding to di-isopropylketone and ethyl isobutyrate are present. It can therefore be concluded that this fraction is an intermediate degration product of polydimethylketene.

The course of this reaction agrees with the known reaction of β-diketones in an alkaline medium. This dimethylketene polymer shows, however, exceptional stability against attack by alkali and very drastic conditions are necessary for its degradation.

The structure of this polymer has also been confirmed by reducing the carbonyl groups with lithium aluminum hydride (LiAlH$_4$) in the following manner:

4.2 gm. of polymer are suspended in 100 cc. of tetrahydrofurane and 50 cc. of a saturated lithium aluminum hydride solution in ether are added. A remarkable evolution of heat is observed and the polymer is dissolved within about half an hour. After about 10 hours at 50° C., the lithium aluminum hydride excess is destroyed with methanol and, after evaporation of the solvents, 3.6 gm. of a white glass-like substance, softening at about 70° C., are isolated by extraction with a solution of ethyl ether and methanol. This substance is found to be amorphous by X-ray examination. It is insoluble in ethyl ether, acetone, carbon tetrachloride and ethyl acetate, and soluble in acetic acid, dimethylformamide, chloroform, ethyl alcohol and in aqueous ethyl alcohol solutions.

From the infrared absorption spectrum, it can be deduced that only traces of carbonyl groups are present. There is a very intensive absorption at 3.02μ which can be ascribed to the presence of alcoholic hydroxyl groups to the extent of 1 hydroxyl group per monomeric unit.

The solubility in polar solvents and the infrared absorption spectrum show that the product obtained by reduction of the polydimethylketene not extractable with toluene consists essentially of long sequences of the type:

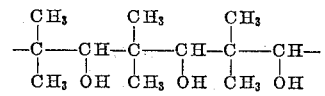

It has been further demonstrated that the chemical structure of the polymeric fractions soluble in benzene is quite different. The infrared examination of the fractions of the dimethylketene polymers not extractable with ethyl ether, but extractable with benzene has shown that the macromolecules which form these fractions possess a unitary chemical structure, especially when obtained from crude polymers prepared in the presence of triethyl aluminum. In the infrared spectrum of these fractions, the bands at between 5.85 and 6μ (which can be clearly observed in the spectra of the polymer not extractable with toluene) are absent or practically absent. On the contrary, the absorption bands at between 5.71 and 5.76, which are to be ascribed to groupings of the ester type, are clearly observable. A structure of this type for the polymer is also in agreement with their transparency and the absence of U.V. absorption peaks at 0.28–0.30μ.

The presence of this structure of the polyester type is demonstrated by the following hydrogenolysis with lithium aluminum hydride:

To 5 gm. of a polydimethylketene fraction not extractable with ethyl ether and soluble in boiling benzene, dissolved in 80 cc. tetrahydrofurane, are added 30 cc. of a saturated solution of lithium aluminum hydride in ether. A rapid reaction takes place and the mixture is kept at 25° C. for about 4 hours. The excess lithium aluminum hydride is destroyed, the solvents are evaporated and, after acidification with a 10% sulphuric acid solution, the product is extracted repeatedly with ether. From the ether extract, 4 gm. of an oily, colorless liquid are isolated by distillation at between 96° C. and 99° C. under a pressure of 20 mm. of mercury.

Examination by chromatography in the vapor phase demonstrates that this fraction consists of about 95% of a single chemical compound. This compound, from the infrared and U.V. spectra and from a cryoscopic determination of the molecular weight, is found to be 2,2,4-trimethyl-3-keto-pentane-1-ol, which corresponds to the formula:

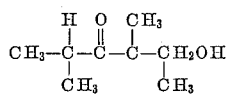

It is known that in a reaction with lithium aluminum hydride, the formation of a primary alcoholic group can occur only by the reduction of a carboxylic group, while a carbonyl group can be formed by rearrangement of a salt of the enolic form of a ketone.

The formation of a keto-alcohol takes place according to the following scheme and demonstrates that the macromolecules of the poly-dimethylketene fraction extractable with benzene possess a structure of the polyester type in which the repeated unit consists of two monomeric units.

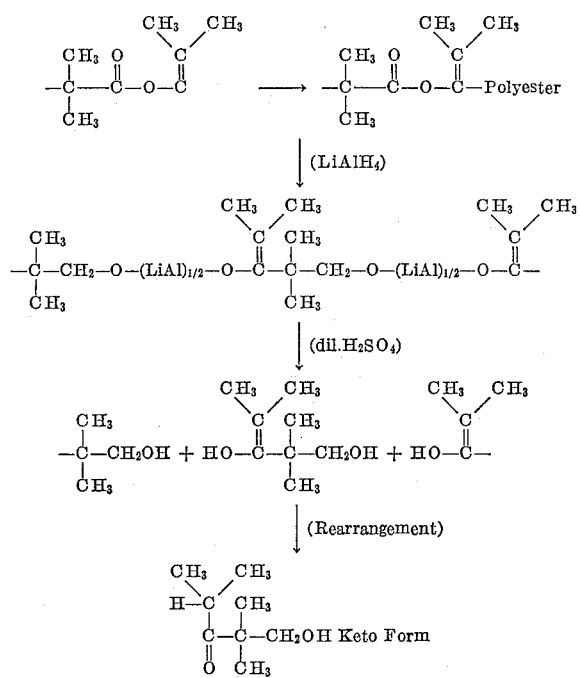

The fraction of dimethylketene polymer not extractable with boiling benzene but extractable with toluene, which in general amounts to up to ten percent of the total polymer obtained, is found by infrared examination to contain keto groups as well as ester-type groups.

Owing to their linear structure, their not too high melting point and the presence of polar groups in the polymeric chains, the crystalline polymers of dimethylketene of the present invention are suitable for the preparation of textile fibers. These fibers are also much more easily dyeable than those obtained from hydrocarbon polymers.

The dimethylketene polymers which are insoluble in boiling toluene are of remarkable interest, because of their high melting point (240–250° C.) and high crystallinity.

These polymers can be easily used as thermoplastic polymers, can be compression-molded, extruded or injection-molded with the machinery normally used for working thermoplastic resins. Their high crystallization rate and high crystallinity make it possible to obtain finished products from them without the need for annealing operations, thus avoiding the deformation of the articles after molding.

The main chain, in spite of the presence of quaternary carbon atoms, still exhibits good flexibility and this favors orientation by mechanical unidirectional operations, such as rolling and stretching. By stretching the extruded filaments, it is thus possible to obtain well oriented highly crystalline fibers, having a high tensile strength.

The following examples are given to illustrate the invention. Although these examples all relate to dimethylketene, the higher homologues of the series such as: diethyl-, diisopropyl-, dibutylketene and dicycloalkyl- and substituted or unsubstituted diphenylketenes such as dicyclohexyl-, diphenyl- and ditolylketene can be polymerized with similar results.

*Example 1*

20 cc. (about 16 g.) of dimethylketene are introduced at —78° C. into a 50 cc. large test tube kept under nitrogen. Polymerization of the monomer starts upon the addition of 0.3 cc. of a 0.5 molar toluene solution of $AlBr_3$, while keeping the temperature at —78° C. The solution slowly becomes more and more viscous while the initially intense yellow color tends to disappear. After about 20 hours, the mass is treated with a few cc. of ethyl ether in order to extract the catalyst, and an excess of methanol is then added. The white polymer thus freed from residual monomer is treated with boiling methanol for a short time and appears finally as a powdery product.

The polymer is filtered and dried and amounts to 8.5 gm.

By successive extraction with various boiling solvents in a Kumagawa extractor, the following four fractions are separated:

| | Percent by wt. on the total |
|---|---|
| Acetone extract | 6.15 |
| Ethyl ether extract | 0.55 |
| Toluene extract | 11.6 |
| Residue | 81.6 |

The fractions extractable with acetone and ether consist of solid products, amorphous upon X-ray examination.

The fraction extracted with benzene gives, by X-ray examination carried out on the powdered polymer, the diffraction spectrum reported in FIGURE 1, which demonstrates that this fraction possesses a high degree of crystallinity. The residue fraction not extractable with toluene consists of a solid white powdery product which has a melting point of about 255° C. under the polarizing microscope.

FIGURE 2 shows the X-ray diffraction spectrum, recorded with a Geiger counter (CuKα), of polydimethylketene not extractable with toluene, examined in the powdered state.

As it is apparent from FIGURE 2, this fraction shows a very high degree of crystallinity, clearly different from the crystallinity shown by the fraction extractable with toluene.

The infrared spectra of the benzene extract and of the residue are also completely different from each other.

*Example 2*

20 cc. of freshly distilled dimethylketene are cooled to —50° C. and 1 cc. of a 10% ether solution of $AlBr_3$ is added. Operating as described in Example 1, the mass is allowed to stand for several hours and is then treated with ether. To the suspension thus obtained an excess of methanol is added, and the product obtained is filtered and vacuum dried.

The polydimethylketene thus isolated amounts to 10 gm. and is soluble in dimethylformamide at a temperature of 140–150° C.

The polymer is partially soluble in decahydronaphthalene and in boiling xylene, but its solubility in carbon tetrachloride, toluene and benzene is low.

Fractionation with boiling solvents in a Kumagawa extractor gives the following results:

| | Percent by wt. on the total |
|---|---|
| Acetone extract | 11.3 |
| Ethyl ether extract | 4.6 |
| Benzene extract | 44.9 |
| Residue | 38.8 |

The acetone and ether extracts are amorphous and their X-ray diffraction spectra are similar to those obtained from the polymers prepared according to Staudinger in the presence of tertiary amines. The X-ray examination of the benzene extract and of the residue confirms the existence of two different chemical structures which are both crystalline.

The residue after benezene extraction has a melting point of 247° C. under the polarizing microscope but shows, by X-ray and infrared examination, the presence of small amounts of a crystalline polymer of a type which is, for the most part, extractable with benzene.

The fraction extractable with benzene has an intrinsic viscosity in tetrahydronaphthalene at 135° C. of 0.30.

Example 3

9 cc. of dimethylketene, purified by vacuum distillation, are polymerized by the addition of 1 cc. of a 10% heptane solution of $AlCl_2(C_2H_5)$. The bath is kept at about —60° C. After several hours, ether is added in order to eliminate the catalyst and then an excess of methanol is added. The precipitate, after filtration and drying amounts to 1.1 gm.

The X-ray examination of the crude product gives a diffraction spectrum from which it is evident that the polydimethylketene obtained is highly crystalline and consists substantially of a mixture of two crystalline polymers which can be separated by extraction with boiling toluene.

Example 4

1 cc. of a 10% heptane solution of triethyl aluminum is added under nitrogen, at —80° C., to 20 cc. of freshly distilled dimethylketene. The temperature of the cooling bath is raised to —30° C. and the solution is allowed to stand. The mass rapidly becomes more and more viscous and after a few hours it is completely gelled. An excess of methanol is added to the cold mass, which is then heated under reflux. The white powdery product is filtered and dried. This product amounts to 8.4 gm.

The crude non-oriented polymer is found to be highly crystalline by X-ray examination.

Solvent extraction in a Kumagawa extractor shows that about 5% of the polymer is not extractable with boiling toluene.

Example 5

1 cc. of 10% diethyl beryllium $(Be(C_2H_5)_2)$ solution in n-heptane is added to 23 cc. of freshly distilled dimethylketene kept at —80° C. The solution thus obtained, when immersed in a salt-ice bath at —10° C., readily becomes turbid and after about 1 hour the mass is almost solid. It is poured into methanol and, after filtering and drying, 9.1 gm. white fibrous polymer are isolated.

The fractionation by successive extraction with boiling solvents in a Kumagawa extractor gave the following results:

| | Percent by wt. on the total |
|---|---|
| Ethyl ether extract | 4.5 |
| Benzene extract | 11.7 |
| Toluene extract | 4.3 |
| Residue | 79.5 |

X-ray examination shows the ether extract to be amorphous, while the residue after extraction with toluene shows a high crystallinity and gives a diffraction spectrum (CuKα) practically identical to that indicated in FIGURE 2.

Example 6

Operating as described in Example 5, 2 cc. of 10% diethyl beryllium $(Be(C_2H_5)_2)$ solution in n-heptane are introduced into 32 cc. of dimethylketene dissolved in 40 cc. of toluene while the temperature is kept at —55° C. The reaction is slower than in the preceding example, but after some hours the mass becomes solid and almost colorless. 10.4 gm. of polydimethylketene containing a very high proportion of macromolecules with β-ketonic structure are isolated. The extraction in succession with boiling solvents in a Kumagawa extractor gives the following results:

| | Percent by wt. on the total |
|---|---|
| Ethyl ether extract | 2.8 |
| Benzene extract | 5.1 |
| Toluene extract | 4.8 |
| Residue after toluene extraction | 87.8 |

Example 7

12 cc. of dimethylketene are distilled under reduced pressure into a test tube containing 0.3 cc. of dibutyl zinc $(Zn(C_4H_9)_2)$ dissolved in 20 cc. of toluene, while immersed in a cooling bath at —78° C. The temperature of the reaction tube is then raised to —55° C. The viscosity of the solution increases quickly and after one night the mass has become colorless. It is coagulated with methanol and, after washing and drying, 6.8 gm. of a white fibrous polymer are isolated.

Many variations and modifications can, of course, be made without departing from the scope of the present invention.

Having thus described the present invention, what it is desired to secure by Letters Patent and what is claimed is:

1. Linear, high-molecular weight crystalline polydimethylketene polymers, said polymers being selected from the group consisting of
    (1) polydimethylketene polymer, the macromolecules of which consist essentially of head-to-tail enchainments of monomeric units of the formula

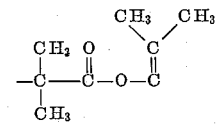

said polymer being substantially insoluble in acetone but being substantially soluble in benzene and showing the X-ray diffraction pattern of FIG. 1, and
    (2) polydimethylketene polymer, the macromolecules of which consist essentially of head-to-tail enchainments of monomeric units of the formula

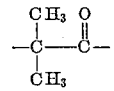

said polymer being substantially insoluble in boiling toluene and showing the X-ray diffraction pattern of FIG. 2.

2. A polydimethylketene polymer, the macromolecules of which consist essentially of head-to-tail enchainments of monomeric units of the formula

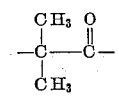

said polymer being substantially insoluble in boiling toluene and showing the X-ray diffraction pattern of FIG. 2, said polymer having a melting point of at least about 240° C.

3. The product of claim 2 in fibrous form.

4. A process of preparing the product of claim 1 which comprises polymerizing dimethylketene at a temperature of from about —100° C. to +25° C. and in the presence of an effective amount of a catalyst having the formula $AlR'_nX_m$, wherein R' is selected from the group consisting of a hydrogen atom, alkyl, aryl, and alkoxy groups, X is a halogen, $m$ is selected from the group consisting of 0, 1, 2 and 3 and $n$ is $3-m$.

5. A process for preparing the product of claim 1 which comprises polymerizing dimethylketene at a temperature ranging from about $-100°$ C. to $+25°$ C. and in the presence of an effective amount of an organo-metallic compound of a metal selected from Group II of Mendeleeff's Periodic Table.

6. The process of claim 4 further characterized in that the catalyst is an aluminum halide.

7. The process of claim 4 further characterized in that the catalyst is an aluminum alkyl.

8. The process of claim 4 further characterized in that the catalyst is an ether complex of an aluminum halide.

9. The process of claim 6 further characterized in that the aluminum halide is $AlBr_3$.

10. The process of claim 7 further characterized in that the aluminum alkyl is triethyl aluminum.

11. The process of claim 4 further characterized in that the catalyst is an alkyl aluminum halide.

12. The process of claim 11 further characterized in that the alkyl aluminum halide is monoethyl aluminum dichloride.

13. The process of claim 5 further characterized in that the organo-metallic compound is a beryllium dialkyl.

14. The process of claim 5 further characterized in that the organo-metallic compound is an alkyl beryllium monohalide.

15. The process of claim 5 further characterized in that the organo-metallic compound is a magnesium dialkyl.

16. The process of claim 5 further characterized in that the organo-metallic compound is an alkyl magnesium monohalide.

17. The process of claim 5, further characterized in that the organo-metallic compound is zinc dialkyl.

18. The process of claim 5 further characterized in that the organo-metallic compound is alkyl zinc monohalide.

19. The process of claim 5 further characterized in that the polymerization is conducted at a temperature ranging from about $-80°$ C. to $+10°$ C.

References Cited by the Examiner

UNITED STATES PATENTS 2,881,156   4/1959   Pilar et al. _____ 260—94.9
2,962,485   11/1960  Walter et al. _____ 260—585.5

OTHER REFERENCES

Johnson et al.: Journal American Chemical Society, vol. 62, pages 964–72 (1940).

Beel et al.: Journal American Chemical Society, vol. 76, pp. 905–7 (1954).

Rosa, Funccao Cetenica: "Revista da Sociedade Brasilerra de Chimica," vol. 2, pages 312–325.

Furukawa et al.: "Polymerization of Diketene," Dic Makromolekulare Chemie, vol. 39, No. 3, August 1960, pp. 243–245.

LEON J. BERCOVITZ, *Primary Examiner.*

HAROLD N. BURSTEIN, JOSEPH R. LIEBERMAN,
*Examiners.*

J. T. BROWN, JOHN J. KLOCKO, *Assistant Examiners.*